US010039275B2

(12) United States Patent
Grillo

(10) Patent No.: US 10,039,275 B2
(45) Date of Patent: Aug. 7, 2018

(54) WEARABLE SUPPORT FOR A FISHING POLE

(71) Applicant: GRILLOX S.R.L., Selvazzano Dentro (IT)

(72) Inventor: Davide Grillo, Selvazzano Dentro (IT)

(73) Assignee: GRILLOX S.R.L., Selvazzano Dentro (IT)

( * ) Notice: Subject to any disclaimer, the term of this patent is extended or adjusted under 35 U.S.C. 154(b) by 0 days.

(21) Appl. No.: 15/309,021

(22) PCT Filed: May 5, 2015

(86) PCT No.: PCT/IT2015/000122
§ 371 (c)(1),
(2) Date: Nov. 4, 2016

(87) PCT Pub. No.: WO2015/170357
PCT Pub. Date: Nov. 12, 2015

(65) Prior Publication Data
US 2017/0118969 A1  May 4, 2017

(30) Foreign Application Priority Data
May 7, 2014  (IT) ................ VI2014A0123

(51) Int. Cl.
A01K 97/10 (2006.01)
(52) U.S. Cl.
CPC .................... A01K 97/10 (2013.01)
(58) Field of Classification Search
CPC ............ A45F 2003/006; A45F 2005/008
USPC ............................... 224/271, 269
See application file for complete search history.

(56) References Cited

U.S. PATENT DOCUMENTS

| 2,735,596 | A | * | 2/1956 | Smedley et al. ....... | A01K 97/10 224/242 |
| 2,742,210 | A | | 4/1956 | Bortz | |
| 2,969,899 | A | * | 1/1961 | Brooks ................ | A01K 97/10 224/267 |
| 3,287,844 | A | * | 11/1966 | Hoxter ................ | A01K 97/10 43/21.2 |
| 4,828,152 | A | | 5/1989 | Pepping | |
| 5,088,634 | A | * | 2/1992 | MacLaren ............ | A45F 5/00 224/268 |
| 5,738,257 | A | | 4/1998 | McConnell | |

(Continued)

OTHER PUBLICATIONS

International Search Report and Written Opinion for PCT/IT2015/000122, dated Sep. 9, 2015.

(Continued)

Primary Examiner — Brian D Nash
(74) Attorney, Agent, or Firm — Harness, Dickey & Pierce, P.L.C.

(57) ABSTRACT

A wearable support for a fishing rod (100) which includes:—a lower portion (11) shaped to rest to the thighs of a user and provided with a seat (12) configured to support the handle of the fishing rod (100);—an upper portion (13) fixed to the lower portion (11) and shaped to lean against the lower abdomen of a user and attachable to the waist of the latter;—coupling means (14), fixed to the upper portion (13) and adapted to be attached to the fishing rod (100) and particularly to the reel (102) of the same, to support it as the latter has the handle that engages the seat (12) of the lower portion (11).

8 Claims, 2 Drawing Sheets

(56) References Cited

U.S. PATENT DOCUMENTS

| | | | | |
|---|---|---|---|---|
| 5,855,086 | A * | 1/1999 | Pandeles | A01K 97/10 |
| | | | | 224/922 |
| 5,953,846 | A | 9/1999 | Shelton | |
| 6,185,856 | B1 * | 2/2001 | Yakabe | A01K 97/10 |
| | | | | 224/200 |
| 6,591,540 | B1 * | 7/2003 | Chargois | A01K 97/10 |
| | | | | 224/922 |
| 7,146,763 | B1 * | 12/2006 | Stanton | A01K 97/10 |
| | | | | 114/364 |
| 7,621,066 | B1 * | 11/2009 | Mathison | A45F 3/10 |
| | | | | 224/185 |
| 8,181,381 | B1 | 5/2012 | Kelleher | |
| 8,690,035 | B2 * | 4/2014 | Silverman | A01K 97/10 |
| | | | | 224/261 |

OTHER PUBLICATIONS

Search Report and Written Opinion for IT VI20140123, dated Jan. 22, 2015.

* cited by examiner

WEARABLE SUPPORT FOR A FISHING POLE

CROSS-REFERENCE TO RELATED APPLICATIONS

This application is a National Stage of International Application No. PCT/IT2015/000122, filed May 5, 2015, and claims the benefit of IT VI2014A000123, filed May 7, 2014. The entire disclosures of each of the above applications are incorporated herein by reference.

The present invention relates to a wearable support for fishing pole particularly suitable for the fishing combat phase.

In particular, the present invention relates to a wearable support suitable to be worn when the fish bites.

Therefore the present invention is in the field of fishing equipment.

Nowadays, a known support for a fishing rod consists of two main components:
- a plaque bearing for the end of the handle of the fishing rod and
- a pulling equipment, wearable by the angler and adapted to be attached to a fishing rod reel.

The plate is provided with a seat for the bottom end of the handle of the rod and has two lateral portions adapted to rest each on the front the thighs of the angler.

The seat is placed centrally to the plate, i.e. between the two side portions.

This traditional support also comprises a belt, for attaching the plate to the waist of the angler.

The pulling equipment consists of lumbar band and two hooking elements, adapted to connect the lumbar band to the reel.

The lumbar band has a rear portion shaped to be supported in the lumbar region of the angler and a front portion configured to be connected to the hooking elements.

A drawback of this traditional support is that it is laborious to wear so that, when the fish bites it renders difficult to the angler retaining the rod and at the same time wearing as quickly as possible the support.

In addition, this support requires the angler to assume a body configuration in which the torso is off balance being bent backward to counteract the pulling force exerted by the fish on the rod so that, in case the fishing line breaks during the fight, it is substantially unavoidable to fall back and it is likely to get injured.

A further drawback of the traditional support described above is the difficulty implied in removing the same from the body of the angler.

This drawback results in a dangerous situation in case the angler needs to rapidly disengage from the fishing rod for avoiding to be pulled into the water by the fish.

The problem underlying the present invention is to provide for a wearable support for a fishing rod safer and faster to wear than the traditional ones.

The main aim of the present invention is to provide a wearable support for a fishing rod that puts solution to this problem by overcoming the drawbacks of the traditional support described above.

Within this aim, it is an task of the present invention to provide for wearable support for a fishing rod which is structurally simpler than the traditional supports.

Another object of the present invention is to provide a wearable support for a fishing rod that is worn more quickly than the traditional supports.

Another object of the invention is to provide for a wearable support for a fishing rod that allows it to be removed from the angler's body more easily and quickly than conventional supports.

A further object of the invention is to provide for a wearable support for a fishing rod which, in use during a fight, allows the angler to rest in a position more stable and less tiring to maintain, compared to traditional supports.

This aim, these objects and others that will become apparent hereinafter are achieved by a wearable support for a fishing rod according to the appended claim 1. Preferable features of the wearable support for a fishing rod according to the invention are given in the dependent claims.

Further characteristics and advantages of the invention will become apparent from the description of a preferred but not exclusive embodiment of a wearable support for a fishing rod according to the invention, illustrated only by way of non-limitative example in the accompanying drawings, in which.

Figure 1:
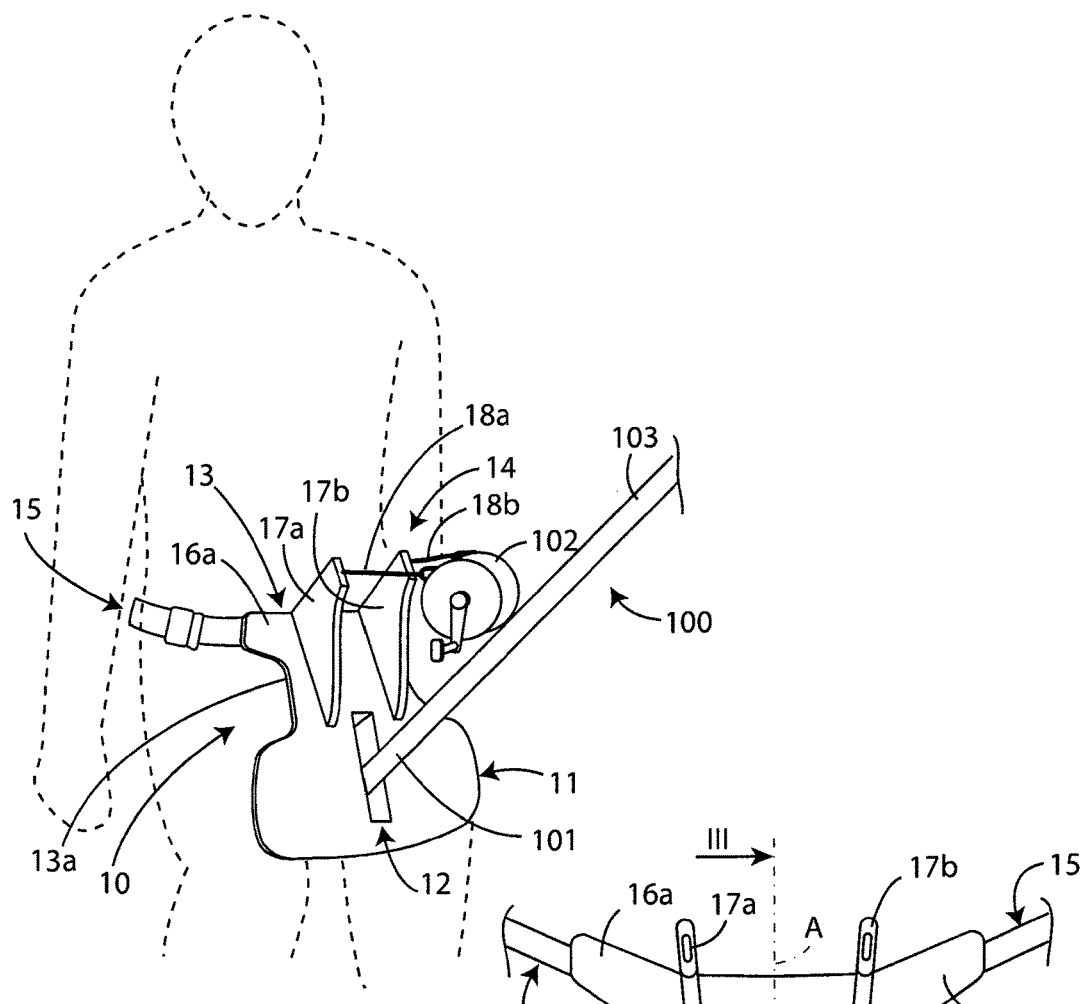
FIG. 1 shows a wearable support for a fishing rod, according to the present invention, in a perspective view in a use configuration.
Figure 2:
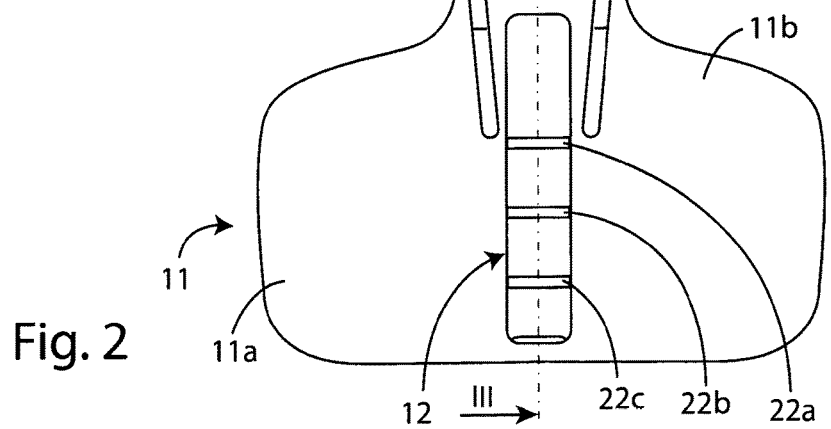
FIG. 2 shows the support of FIG. 1 in a frontal view.
Figure 3:
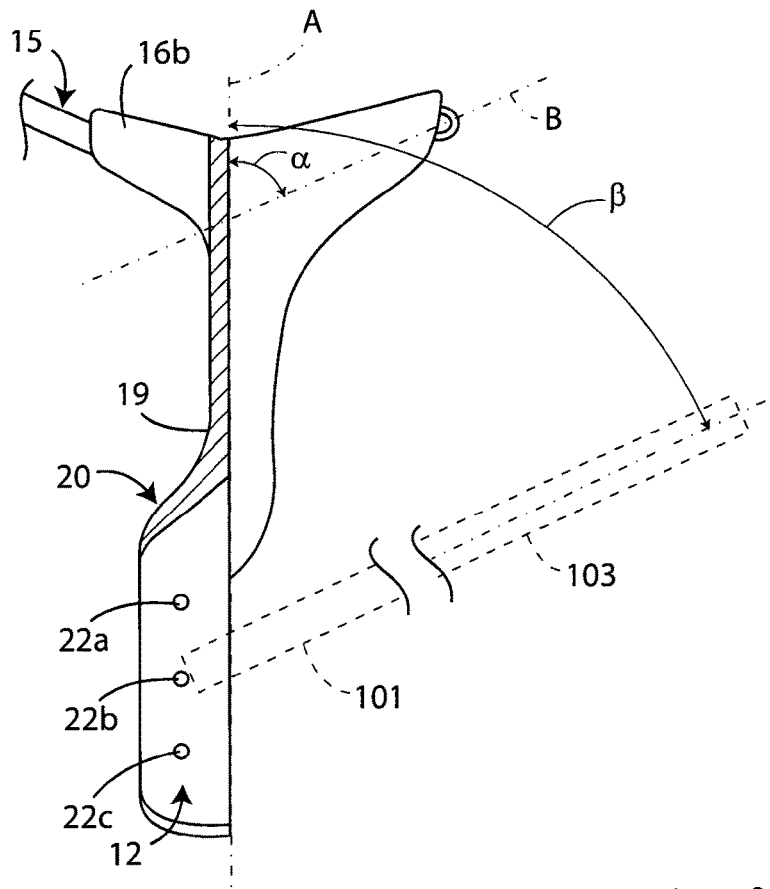
FIG. 3 shows a cross sectional view of the support of FIG. 1 with respect to plane III-III of FIG. 2.

With particular reference to the above figures, it is generally indicated with reference 10 a wearable support for a fishing rod 100 which comprises a lower portion 11 shaped to lean against the thighs of a user and provided with a seat 12 configured to support the handle 101 of the fishing pole 100.

In accordance with the present invention, the support 10 has a particular peculiarity in that it comprises:
- an upper portion 13 shaped to lean against the lower abdomen of a user and attachable to the waist of the latter;
- coupling means 14, fixed to the upper portion 13 and adapted to be hooked to the fishing rod 100 to support it as the latter has the handle that engages the seat 12 of the lower portion 11.

The upper portion 13 is fixed to the lower portion 11 and preferably is rigidly fixed to the latter to form a rigid body suitable for supporting the fishing rod 100 during a fishing fight, more preferably the two portions 11, 13 make a single body.

The two portions 11 and 13 are advantageously made in a rigid and lightweight material, preferably in aluminum or in a light alloy.

Alternatively one or both portions 11 and 13 are advantageously made of composite material, preferably carbon fiber based.

In a preferred embodiment of the present invention the two portions 11, 13 form a single body made of aluminum or light alloy or carbon fiber, or other composite material.

In other words, a support 10 according to the present invention features the particular peculiarity that the two portions 11, 13 and the coupling means 14 are mutually associated so as to form a wearable monolithic product.

Unlike traditional wearable supports, which comprise a support plate and a pulling equipment that are separate each other and must be worn independently, the support 10 according to the present invention incorporates a support plate, which is defined by the lower portion 11 and a pulling equipment which is defined by the upper portion 11 and the coupling means 14.

In practice, when the fight begins the angler can wear the single bodied support 10, without having to wear different components, since the former is a unitary article.

This brings the great advantage of allowing to wear very quickly the support 10 and to be able to just as quickly remove it from the angler's body in case of danger.

A further important advantage which derives from the support 10 according to the present invention, consists in the fact that, during combat, the angler can exert a pulling force on the rod attached to the support 10 simply by inclining backwards the thighs.

In contrast, traditional, supports require to bend backwards the back to exert a pulling force on the fishing rod, by means of the traditional lumbar band. This aspect of the support according to the present invention makes the same particularly secure during use as it enables the angler to maintain balance much more effectively especially in case of breakage of the line, avoiding the falling backwards typical of the traditional supports.

In accordance with the present invention, a support 10 advantageously comprises a deformable element 15 fixed to the upper portion 13 and adapted to encircle the waist of a user to fix thereto the upper portion 13. Preferably, the deformable element 15 comprises a belt. Advantageously, the upper portion comprises two lateral elements 16a, 16b shaped so that in use they form a horizontal band, preferably anatomical, superimposed on the front of the user's waist.

The aforesaid belt preferably is fixed to the side elements 16a, 16b so as to act as a conformable continuation of the user's body.

Advantageously, the belt has a rapid closure.

The support 10 may be worn simply by securing it to the angler's body by means of the aforesaid belt.

Advantageously, the coupling means 14 comprise at least an arm 17a, 17b projecting from the upper portion 13 and at least a variable configuration element 18a, 18b adapted to attach the fishing rod 100 to the arm 17a, 17b.

The coupling means 14 preferably comprise two arms 17a, 17b projecting substantially parallel each other from the upper portion 13 and at least two variable configuration elements 18a, 18b each fixed to a free end of one of the arms 17a, 17b, and suitable to be coupled to a reel 102 the fishing rod 100.

The variable configuration elements advantageously include belts, chains or ropes or quick release snap-hooks.

The arms 17a, 17b are preferably configured such that, when the support 10 is in use, they protrude partially upward, as exemplified in FIG. 1.

Advantageously, the two portions 11 and 13 are integral and form a monolithic product that has a main development direction in which, when the support 10 is worn, they extends from the belly of the user towards the knees.

Preferably, this article is substantially symmetrical with respect to said development direction A. In more detail, preferably the lower portion 11 has two lateral parts 11a and 11b, symmetrical each other with respect to the development direction, between which there is the seat 12.

Each side is formed, preferably anatomically, to rest on the area of the thigh's quadriceps.

The upper portion 13 is advantageously T-shaped so as to comprise:
- a central element 13a joined to the lower portion 11, and aligned along the development direction of A to seat 12;
- the arms 17a and 17b that protrude from the central element 13a laterally and symmetrically each other with respect to the development direction A.

The arms preferably extend in a extension direction B that preferably forms, with the development direction A, an angle α comprised between 60° and 90° so as to obtain optimum support of the fishing rod 100.

In general, in accordance with the present invention, preferably the upper portion 13 and the lower portion 11 extend in a substantially straight direction. The upper portion 13 and lower portion 11 and the coupling means 14 are configured so that, when a fishing rod 100 has the handle inserted in the seat 12 and is coupled to the upper portion 13 by means of the coupling means 14, the stem 103 of the fishing rod 100 has, at rest, an angle β between 70° and 80° with respect to said rectilinear direction.

Such rectilinear direction, in the accompanying drawings corresponds to the development direction A.

The lower portion 11 advantageously comprises:
- a rear face 19 adapted to rest on the user's thighs;
- a protruding element 20, projecting from the rear face 19 to be, in use, between the thighs of the user.

The seat 12 advantageously comprises:
- a cavity 21, internal to the protruding element 20 and
- at least one support element 22a, 22b, 22c, fixed in the cavity 21 and adapted to support the end of the handle of the fishing rod 100.

Preferably there are three support elements 22a, 22b, 22c.

The support elements 22a, 22b, 22c are arranged in the cavity 21 advantageously such that, in use, the end of the handle, when it is inserted in contact with one of the support elements 22a, 22b, 22c, is in a position rearward with respect to the front surface of the user's thighs so as to confer greater stability to the fishing rod 100.

Figure 4:
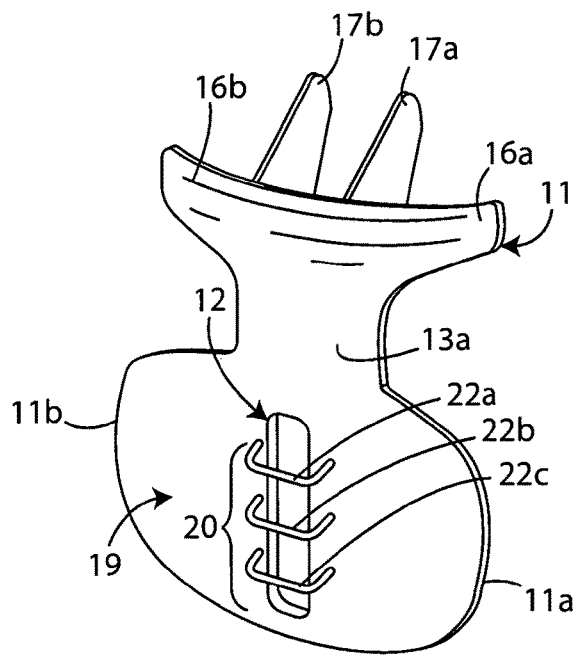
FIG. 4 shows a variant of the wearable support for a fishing rod of the previous figures.

In accordance with a preferred but not exclusive alternative of the support 10, exemplified in FIG. 4, the protruding element is defined by a plurality of U-shaped brackets, projecting from the rear face 19 of the lower portion 13 so as to present its own central part, facing the seat 12.

Each central part advantageously defines one of the support elements 22a, 22b, 22c.

The support according to the present invention is faster and easier to wear than traditional supports and allows to hold the fishing rod, during combat in an optimal configuration to limit the efforts of the angler and optimize the effectiveness of the actions carried out by the angler during the fight with the fish.

The support according to the present invention, moreover, allows to greatly reduce the efforts of fighting allowing greater use of the muscles of the legs rather than the lumbar or the abdominal area of the angler.

The support according to the present invention is safer for the angler, in that it allows to be separated from the body in a simple and fast way.

This innovative support also allows the angler who uses it to take a position more stable than traditional media, limiting or avoiding the risk of falling and possibly injuring the angler in the event of breakage of the line during the fight.

The invention thus conceived is susceptible of numerous modifications and variations, all falling within the scope of protection of the appended claims.

Moreover, all the details may be replaced with other technically equivalent elements.

In practice, the materials employed, as well as the shapes and the dimensions, may be varied depending on the contingent requirements and the state of the art. Where the constructive characteristics and techniques mentioned in the following claims are followed by reference signs or numbers, such signs and reference numbers have been affixed with the sole purpose of increasing the intelligibility of the claims themselves and, consequently, they do not constitute in any way a limit to the interpretation of each element identified purely by way of example, by such signs and reference numbers.

The invention claimed is:

1. A wearable support for a fishing pole comprising a lower portion shaped to lean against to a user thighs and provided with a seat configured to support the handle of the fishing pole, said support being characterized by comprising:
   an upper portion shaped to lean against the lower abdomen of a user and attachable to the waist of the latter, said upper portion being fixed to said lower portion; and
   coupling means, fixed to said upper portion and adapted to be secured to the fishing pole to support it when the latter has the handle that engages the seat of said lower portion,
   wherein said coupling means comprise two arms projecting from said upper portion and two variable configuration elements each fastened to a free end of one of said arms and suitable to be coupled to a reel of the fishing pole,
   wherein said lower portion and said upper portion are integrally attached and form a monolithic body that extends from the lower abdomen of the user toward knees of the user.

2. The support according to claim 1, wherein the lower portion is rigidly fixed to the upper portion to form a rigid body adapted to support the fishing pole during a battle.

3. The support according to claim 1, wherein said lower portion is a single body with said upper portion.

4. The support according to claim 1, further comprises a deformable element fixed to said upper portion and adapted to encircle the user waist to attach to the user's waist said upper portion.

5. The support according to claim 1, wherein said arm is configured so as to protrude partially upwards when said support is in use.

6. The support according to claim 1, wherein said upper portion and said lower portion develop according to a substantially rectilinear direction; and in that said upper portion, said lower portion and said coupling means are configured so that, when a fishing pole has the handle inserted in said seat and is engaged to said upper portion by said coupling means, the rod of the pole, at rest, forms an angle of between 70° and 80° with respect to said rectilinear direction.

7. The support according to claim 1, wherein said lower portion comprises:
   a rear face adapted to rest on the thighs of the user; and
   a protruding element, projecting from said rear face to be, in use, inserted between the thighs of the user.

8. The support according to claim 7 wherein said seat comprises a cavity internal to said protruding element and at least one support element, fixed in said cavity and adapted to support the end of the handle of the fishing pole; said at least one support element being disposed in said cavity so that, in use, the end of the handle, when it is inserted in contact with said at least one support element is in a retracted position with respect to the front surface of the user's thighs.

* * * * *